United States Patent Office 3,073,787
Patented Jan. 15, 1963

3,073,787
IMPROVED PROCESS FOR PREPARING RESILIENT ISOCYANATE FOAMS
Stanley Earl Krakler, Wilmington, Del., assignor to E. I. du Pont de Nemours and Company, Wilmington, Del., a corporation of Delaware
No Drawing. Filed Mar. 7, 1957, Ser. No. 644,474
5 Claims. (Cl. 260—2.5)

This invention is directed to an improved process for making resilient isocyanate foams, said process employing odorless catalysts made from 3-dialkylaminopropionamide and 2-dialkylaminoacetamide. Some of these catalysts display delayed action characteristics. The foams obtained are useful for insulation, upholstery, mattress, and rugbacking applications.

Volatile tertiary amines present serious difficulties when they are employed as catalysts for resilient isocyanate foams. Operators exposed to their vapors for several hours without sufficient protection may develop symptoms such as nausea and eye inflammation. The foams themselves may have an unpleasant odor caused by the presence of residual volatile catalyst. This odor may disappear gradually if the foam slabs are exposed to the air; however, when the slabs are stacked, the center slabs may retain the amine odor. This odor problem limits public acceptance of isocyanate resilient foams.

In the art, other catalysts than the volatile tertiary amines have been tried; however, these catalysts have not been satisfactory. Inorganic bases such as sodium hydroxide and potassium carbonate produce mediocre cell structure. Quaternary ammonium hydroxides behave in a similar manner.

It is an object of the present invention to provide an improved process for preparing resilient isocyanate foams.

It is also an object of the present invention to provide a process for preparing odorless resilient isocyanate foams.

It is a further object of this invention to facilitate the fabrication of molded polyurethane products by providing an improved control over the initiation of the isocyanate-water foaming reaction.

The molding of polyurethane foams from prepolymers is difficult because a convenient means for delaying the onset of foaming has been lacking. When the proper amount of a conventional resilient foam catalyst, such a N-methyl morpholine, is introduced into a resilient foam prepolymer at room temperature, the mass begins to react quickly; within about 15–30 seconds, expansion occurs at a significant rate. The mass may be foaming so rapidly after it is properly mixed that it may not be possible to complete the pouring of a large pin-mold in time to close the mold. This handling limitation has led to the use of a wasteful alternative fabrication technique requiring the trimming of large slab stocks.

More specifically, the present invention is directed to a process of preparing a cellular isocyanate structure by mixing a polyhydroxy compound of molecular weight below about 10,000, an arylene polyisocyanate and water, the improvement being in the incorporation into the mixture, prior to the formation of the cellular product, of 0.25 to 3.0% by weight of the total composition of a catalyst of the structure

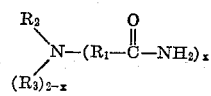

wherein $R_1$ is divalent alkylene radical consisting of a chain of 1 to 2 carbon atoms which may be substituted by alkyl groups; $R_2$ is an alkyl radical of 1 to 6 carbon atoms which may be joined by a carbon-carbon single bond with $R_3$; $R_3$ is an alkyl radical of 1 to 6 carbon atoms which may contain an oxygen atom in the chain when $R_3$ is connected with $R_2$ and $x$ is the integer 1 or 2.

The process improvement provided by the subject invention makes it possible now to prepare resilient polyurethane foams which are odorless, even in the uncured state. This is accomplished by using, in place of the customary volatile tertiary amines, amide derivatives of these amines which have greatly decreased volatility. The catalysts of the present invention have the general structure

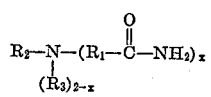

wherein $R_1$ is a chain of 1 to 2 carbon atoms which may contain side chain alkyl groups; $R_2$ and $R_3$ are alkyl groups containing 1 to 6 carbon atoms; $R_2$ and $R_3$ need not be the same; $R_2$ and $R_3$ may be connected by a carbon-carbon bond to form a cycloaliphatic ring (which may include an oxygen atom). Such compounds as 2-dimethylaminoacetamide, 2-diethylaminoacetamide, 2-di-n-propylaminoacetamide, 2-diisopropylaminoacetamide, 2-di-n-butylaminoacetamide, 2-morpholinoacetamide, 3-dimethylaminopropionamide, 3-diethylaminopropionamide, 3-di-n-propylaminopropionamide, 3-diisopropylaminopropionamide, 3-di-n-butylaminopropionamide, 3-diisobutylaminopropionamide, 3-morpholinopropionamide, 3-di-n-hexylaminopropionamide, 3,3'-(ethylimino)dipropionamide, and 3,3'-(n-hexylimino)diproprionamide are useful in this invention.

Some of these catalysts are not only valuable because they are odorless, but also because they possess delayed action characteristics. 2-diethylaminoacetamide provides better delay than N-methyl morpholine at a comparable concentration at room temperature. In particular, 3-morpholinopropionamide is a thermally-activated odorless catalyst. At room temperature, it activity is low enough so that adequate time is provided for conveniently mixing a large quantity of foam procursor, subsequently pouring it into a pin-mold and closing the mold. When the mold is then heated to about 70° C., the activity of the catalyst increases and causes the polyisocyanate mixture to expand and rapidly fill the mold.

The odorless catalyst is introduced into the foam precursor prior to the formation of the cellular product, more specifically, prior to the onset of detectable foaming. The amount of odorless catalyst added may range from 0.25 to 3.0% by weight of the total composition present. The preferred concentration is about 1%.

When polyisocyanates such as isocyanate-modified polyesters, isocyanate-terminated polyalkyleneether glycols, isocyanate-terminated polyhydrocarbon diols, and isocyanate-terminated low molecular polyhydroxy compounds or mixtures of the polyisocyanates are used, it is permissible to disperse the catalyst in them prior to the addition of water, particularly if the catalyst is difficultly water soluble. It is usually preferable, however, to introduce the catalyst into the prepolymer as an aqueous solution. The catalyst (unless it is a delayed-action type such as 3-morpholinopropionamide) should not be added after the water has been stirred into the prepolymer because the mixture generally begins to foam before the catalyst can be dispersed properly. The prepolymer, catalyst, and water, in any case, should be intensively agitated. The resulting foaming mass is then either allowed to rise in place or it is poured into a mold.

The mixture in which the catalyst is present is generally at or near room temperature prior to the initiation of foaming. However, it may be warmer if a suitable delayed-action catalyst is employed.

When the polyurethane is being formed at the same time as the blowing action is occurring, extra heat is evolved and the mixing time is shortened. This situation is met when foams are made by mixing polyhydroxy compounds with polyisocyanates and water. In operations of this type it is preferred that the catalyst and water be mixed into the polyhydroxy compound prior to the introduction of the polyisocyanate.

The 3-dialkylaminopropionamides useful according to the present invention are prepared by the addition of secondary amines to acrylamide; this is exemplified by the following equation:

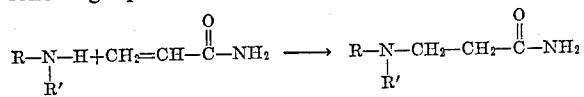

Erickson (J. Am. Chem. Soc. 74, 628 (1952)) has described the preparation of the amides where R and R' are both methyl, n-propyl, n-butyl, and 4-morpholinyl. In general, about 1.1–1.2 moles of amine is employed for each mole of acrylamide. The order of addition of the reactants is unimportant. The reaction temperature is kept below 50° C. A reaction time of about 16 hours is generally sufficient at 40–50° C. At room temperature the reaction may require as long as two weeks for completion. In the preferred procedure the amine (or an alcohol solution of the amine) is added to a well-agitated alcohol solution of acrylamide over a half-hour period during which the temperature is kept below 40° C. The mixture obtained is subsequently agitated at 40–50° C. for about 16 hours. The excess amine and solvent are then removed under vacuum if the product is an oil. The 3-morpholinopropionamide separates from the alcohol solution on cooling as crystals which may be washed free of morpholine.

The 3,3'-(alkylimino)dipropionamides useful in this invention are prepared by the addition of primary amines to acrylamide

In general, about 0.55 mole of amine is employed for each mole of acrylamide. The procedure used is similar to that described for the 3-dialkylaminopropionamides.

The dialkylaminoacetamides useful in this invention are prepared by the hydrolysis of dialkylaminonitriles $R_2N-CH_2-CN$ with sulfuric acid catalyst. The nitriles are prepared by the reaction of the dialkyl amine $R_2NH$ with aqueous formaldehyde and sodium cyanide followed by the addition of hydrochloric acid.

The preferred isocyanate-terminated polytetramethyleneether polyurethane prepolymers are prepared in several steps. The first step comprises agitating a molar excess of the arylene diisocyanate with polytetramethyleneether glycol (number-average molecular weight=3000) for several hours at about 90° C. or at least 16 hours at about 30° C. A small amount of an acrylene triisocyanate such as 2,4,4'-triisocyanatodiphenylether or 2,4,6-triisocyanato toluene may be present during this step. The polymer mixture obtained in the absence of triisocyanates at this point may be represented as

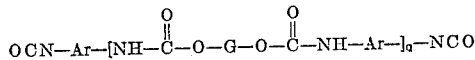

where Ar is a diisocyanate residue containing no substituents active toward isocyanate and O—G—O is a polytetramethyleneether glycol residue whose terminal hydrogen atoms have been removed. The preferred values of the integer "q" are 1, 2 but "q" may be as high as 6.

Some prepolymers of this type may subsequently be heated with added free diisocyanate at 140° C. in order to introduce higher functionality by allophanate formation.

In the final step, all the prepolymers are standardized to the desired percent free NCO content by addition of more diisocyanate. The free NCO content of the prepolymer product is generally 8–12% by weight.

Polyols useful in preparing the isocyanate-terminated polymers are polyalkyleneether glycols, polyalkylenearyleneether glycols, polyalliphatic hydrocarbon diols, and polyesters containing a plurality of hydroxyl groups.

The polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 1000–4000. Some examples of these glycols are polypropyleneether glycol, ethylene oxide-modified polypropyleneether glycol, polypentamethyleneether glycol, polytetramethyleneether glycol, and polytetramethylene formal glycol (the R groups need not be the same). These polyalkyleneether glycols are made by the polymerization of cyclic ethers such as alkylene oxides or dioxolane or by the condensation of the glycols.

The preferred polyol for resilient foams is polytetramethyleneether glycol (number-average molecular weight =3,000) made by the acid catalyzed polymerization of tetrahydrofuran. This glycol is also known as poly-n-butyleneether glycol.

Polyesters containing a plurality of hydroxyl groups are made by the usual methods of condensation polymerization from a diol and a dibasic acid (such as diethylene glycol and adipic acid) plus a small amount of a higher functional compound to provide cross-linking (such as trimethylol propane). The reactants are agitated at 160–200° C. and the water evolved is collected. It generally requires about 48 hours to achieve an acid number below 2.0. The mass is finally heated at about 100° C. under vacuum to remove the last traces of water dispersed in the polyester. The polyester product should have an acid number less than 2, a hydroxyl number between about 30–60 and a water content no greater than 0.05% (by weight).

The polyaliphatic hydrocarbon diols are prepared by polymerizing appropriate polymerizable ethylenically unsaturated monomers at least 50% of which are conjugated dienes such as isoprene. Azo dicarboxylate catalysts serve to provide ester-terminated polymer molecules which can be subsequently reduced by lithium aluminum hydride to the corresponding hydroxyl-terminated polymers.

A wide variety of arylene diisocyanates may be employed in the process either alone or as isomer mixtures or as mixtures of diisocyanates. Representative compounds include toluene-2,4-diisocyanate, 1-chlorophenylene-2,4-diisocyanate, cumene-2,4-diisocyanate, and naphthalene-1,5-diisocyanate. The preferred diisocyanate is toluene-2,4-diisocyanate. The preferred isomer mixture contains 80% toluene-2,4-diisocyanate and 20% toluene-2,6-diisocyanate. Triisocyanates such as toluene-2,4,6-triisocyanate and 2,4,4'-triisocyanato-diphenylether may be used to provide additional cross-linking.

The properties of the resilient polyurethane foams made from polyalkyleneether glycols and hydroxyl-terminated polyesters can be varied widely by proper selection of silicone foam stabilizers. The amounts needed will be rather specific for each prepolymer system and application desired. Polydimethylsiloxane-50 centistokes grade and Organic Modified Silicone Oil X-521 (a "Linde" silicone commercially available from Union Carbide and Carbon Company) are typical of the satisfactory silicones. This Modified Silicone Oil X-521 is a block copolymer made by reacting a triethoxy polydimethyl siloxane (molecular weight 800) with the monomethyl ether of polyethyleneether glycol (molecular weight 750). Mixtures of silicones may be used if desired. When isocyanate-terminated polytetramethyleneether polyurethane prepolymers are foamed it is recommended that the total silicone concentration range between about 0.25–1.0% by weight of prepolymer. Water-insoluble silicones should be carefully mixed with the prepolymer prior to the introduction of the water. Water-soluble silicones may be added with the water.

Coloring materials may be added to the foam precursors in order to give colored foams. Pigments may be included if needed. In general, it is not particularly desirable to introduce materials which will not be adaptable to the elastomeric nature of the resilient foams.

The foaming operation may be carried out in a variety of molds. The walls of the form may be lined with paraffin wax or silicone mold release agent to permit ready removal of the cellular product. The walls may also be uncoated metal, glass, wood, or stone to which the foam becomes bonded as an integral part of the structure. The materials may be foamed around pipes, beams, girders, and the like. If the shape of the mold permits, the mixing operations may be carried out in it. If not, the components may be mixed in a separate container and poured into the mold for subsequent expansion.

The resilient foams obtained should be cured to obtain optimum physical properties. The foams may be heated for an hour at 120° C. in the absence of moisture. They may be cured also by exposure to 100% relative humidity for 5 days at room temperature. The preferred cure comprises treatment at 100° C. for 2 hours in the presence of 50% relative humidity. Foams cured under moist conditions should be dried for 1 hour at 100° C. prior to testing or use.

The measurements on the properties of the cured foams are done in accordance with the following ASTM methods: Compression set by ASTM D-395-59T, Method B; compression deflection by ASTM D-575-46, Method B.

The tensile strength measurements are carried out with an "Accrometer" (Scott Testers Co.) set for a 100-pound load. The foam specimens are cemented to aluminum plugs which contain stems gripped by the testing machine. The samples are drawn apart at a head speed of 2 inches per minute.

The foam pellets are one inch high and 1.129 inches in diameter. The aluminum plugs are 0.5 inch high and 1.129 inches in diameter. Each plug is equipped with a stem 1.0 inch long.

The cement is a mixture of 100 parts of Prepolymer X (described below) and 2 parts of a hardener. This hardener is composed of 100 parts of glycerine and 2 parts of diethanolamine. The hardener is preferably mixed with the prepolymer just before the foam pellets are to be cemented to the plugs. The cemented samples are allowed to stand overnight before testing.

PREPARATION OF PREPOLYMER (X)

85 parts of castor oil, 15 parts of polyethylene glycol (number-average molecular weight=200) and 100 parts of toluene-2,4-diisocyanate are mixed together in a dry reaction vessel protected from atmospheric moisture by a nitrogen sweep. Heat is evolved and the temperature may rise in about 15 minutes to a maximum as high as 120° C. When the temperature begins to fall, the reaction mixture is brought to 100° C. and agitated at 100° C. for 1.5 hours. The prepolymer obtained has a free NCO content of about 14.5% and a Brookfield viscosity at 30° C. of about 8500 cps.

PREPARATION OF PREPOLYMER (A)

Prepolymer (A) is prepared in a dry reaction vessel protected from atmospheric moisture by a slight positive pressure of nitrogen. A mixture of 3,000 parts of polytetramethyleneether glycol of number average molecular weight about 3,000 (containing less than 0.05% water by weight), 148 parts of a 50% by weight solution of 2,4,4'-triisocyanatodiphenylether in toluene-2,4-diisocyanate, and 244 parts of toluene-2,4-diisocyanate (molar ratios of glycol:diisocyanate:triisocyanate 1:1.75:0.25) is agitated at about 35° C. for 21 hours. The isocyanate-terminated polytetramethyleneether polyurethane prepolymer obtained has a Brookfield viscosity at 30° C. of about 60,000 centipoises.

Prepolymer (A) is obtained by adding about 425 parts of toluene-2,4-diisocyanate to standardize the above prepolymer to 8.5% free NCO content.

PREPARATION OF PREPOLYMER (B)

Prepolymer (B) is made in a dry reaction vessel protected from atmospheric moisture by a slight positive pressure of nitrogen. Three thousand (3,000) parts of polytetramethyleneether glycol of number average molecular weight about 3,000 (moisture content of less than 0.05% by weight) and 348 parts of toluene-2,4-diisocyanate are agitated at 90° C. for one hour. The isocyanate-terminated polytetramethyleneether polyurethane prepolymer obtained is diluted at 90° C. with 575 parts of toluene-2,4-diisocyanate. The resultant mixture is heated to 140° C. and agitated at 140° C. for one hour. The mass is subsequently cooled to about 60° C. in about 1 hour and standardized to 9.5% free NCO content by the addition of about 155 parts of toluene-2,4-dissocyanate.

PREPARATION OF PREPOLYMER (C)

Prepolymer (C) is prepared by the same procedure given above for Prepolymer (B) except that in place of the toluene-2,4-diisocyanate a mixture of toluene diisocyanate isomers (80% 2,4- and 20% 2,6-) is employed. It consequently has a 9.5% free NCO content.

PREPARATION OF 3-DIMETHYLAMINOPROPIONAMIDE

This odorless catalyst is prepared by a modification of the method given by Erickson [J. Am. Chem. Soc. 74, 6281 (1952)]. 216 parts of a 25% (by weight) methanolic solution of anhydrous dimethylamine (1.2 moles) is added with stirring to 139 parts of a 50% (by weight) methanolic solution of acrylamide (1.0 mole) at 40° C. over a half hour period. The resulting mixture is agitated for 16 hours at 40–50° C. It is then heated to 100° C. (60 mm. Hg) to remove methanol and dimethylamine. The 3-dimethylaminopropionamide is subsequently collected at 110–117° C. (3.3–3.5 mm. Hg) as an oil in 86% yield.

PREPARATION OF 3-DIETHYLAMINOPROPIONAMIDE 142 parts of a 50% solution of acrylamide (1.0 mole) in ethyl alcohol is prepared. This solution is treated at 38° C. or below by dropwise addition of 80.3 parts (1.1 moles) of diethylamine over a half-hour period. The mixture obtained is agitated at 35–40° C. for 3 hours and subsequently at 45–50° C. for 16 hours. It is then brought to 100° C. (10 mm. Hg) to remove the alcohol and unreacted diethylamine. The residue is vacuum distilled at 127–128° C. (2.6–3.0 mm. Hg) to give an 82% yield of 3-dimethylaminopropionamide obtained as a colorless oil.

PREPARATION OF 3-DI-n-PROPYLAMINOPROPIONAMIDE

This odorless catalyst is prepared by a slight modification of the method given by Erickson [J. Am. Chem. Soc. 74, 6281 (1952)]. 55 parts (0.55 mole) of di-n-propylamine is added, with stirring, to a solution of 36.5 parts (0.5 mole) of acrylamide in 75 parts of methanol. The mixture obtained is allowed to stand without agitation in a closed container at room temperature for 2 weeks. The methanol is removed by distillation at 50° C. under reduced pressure to yield 3-di-n-propylaminopropionamide as a water-soluble oil.

PREPARATION OF 3-DI-n-BUTYLAMINOPROPIONAMIDE

This catalyst is prepared from 71 parts (0.55 mole) dibutylamine and 36.5 parts (0.50 mole) acrylamide by the same procedure used for making 3-di-n-propylaminopropionamide. The product is a water-soluble oil.

PREPARATION OF 3-DI-n-HEXYLAMINOPROPIONAMIDE

This catalyst is prepared from 101.8 parts (0.55 mole) di-n-hexylamine and 36.5 parts (0.50 mole) acrylamide by the same procedure used for making 3-di-n-propylaminopropionamide. The product is a water-soluble oil.

PREPARATION OF 3-MORPHOLINOPROPIONAMIDE 140 parts of a 50% (by weight) solution of acrylamide (1.0 mole) in ethyl alcohol is treated with agitation at about 40° C. by dropwise addition of 98 parts (1.12 moles) of morpholine over a 15-minute interval. Crystals begin to separate during the subsequent 16-hour agitation at room temperature. The mass is cooled to 5° C. and filtered. The crystals obtained are washed with ethyl alcohol and air-dried. 3-morpholinopropionamide is obtained in about a 60% yield as 95 parts of colorless odorless crystals melting at 97–99° C. The pKb of an aqueous solution of the catalyst is 7.8 at 25° C.

PREPARATION OF DIMETHYLAMINOACETONITRILE 660 parts (8.14 moles) of a 37% aqueous formaldehyde solution is added dropwise over a 1-hour period with vigorous agitation to 1320 parts (7.34 moles) of a 25% aqueous dimethylamine solution maintained at a temperature below 25° C. Then 396 parts (7.75 moles) of (98%) sodium cyanide are added to the above mixture over a half-hour period. The resulting solution is agitated at about 25° C. for one hour. Finally, 725 parts of a 37% (by weight) hydrochloric acid solution (7.10 moles) is added while the temperature of the mixture is maintained at about 25° C. The mass is subsequently agitated at room temperature for 16 hours.

The aqueous mixture is placed in a continuous extractor and extracted with 1320 parts of benzene for 16 hours. The benzene layer is separated and dried over anhydrous sodium sulfate. The solution is subsequently fractionally distilled and 450 parts (73% yield) of dimethylaminoacetonitrile (boiling at 134–137° C.) are collected. The residue contains about 10 parts of crude dimethylaminoacetamide.

PREPARATION OF 2-DIMETHYLAMINOACETAMIDE 34 parts (0.4 mole) of dimethylaminoacetonitrile at −15° C. is treated with 27.5 parts of 96% sulfuric acid. The mixture obtained is allowed to stand at room temperature for 3.5 days. It is then poured over ice and water and made alkaline with the addition of 405 parts of 28% aqueous ammonia. The solution is saturated with sodium chloride and extracted with chloroform. The chloroform is dried over sodium sulfate and subsequently concentrated to yield 2-dimethylaminoacetamide which melts at 94–95° C.

PREPARATION OF 3,3'-(ETHYLIMINO)DIPROPIONAMIDE 71 parts (1.1 moles) of a 70% aqueous solution of ethylamine is added over a 15-minute period with stirring to a solution of 142 parts (2.0 moles) of acrylamide in 85 parts of ethyl alcohol. Cooling is provided to keep the temperature below 40° C. during this addition. The mixture obtained is then slowly heated to 50° C. and agitated at about 50° C. for 16 hours. Fractional distillation is then carried out to remove ethyl alcohol and unreacted ethyl amine. A substantially quantitative yield (189 parts) of 3,3'-(ethylimino)dipropionamide is obtained as a viscous oil.

PREPARATION OF 3,3'-(n-HEXYLIMINO)DIPROPIONAMIDE

This catalyst is prepared from 111.1 parts (1.1 moles) of n-hexylamine and 142 parts (2.0 moles) of acrylamide by the same procedure used for making 3,3'-(ethylimino)-dipropionamide. The product is a solid which dissolves in an equal weight of water at 50° C.; it is relatively insoluble in water at room temperature.

The following representative examples are offered for purpose of illustration:

EXAMPLE 1.—USE OF 3-DIMETHYLAMINOPROPIONAMIDE CATALYST

*Foaming of Prepolymer (A)*

1.0 part of polydimethyl siloxane (50 centistoke grade) is stirred for one minute with 100 parts of Prepolymer (A). Then 0.25 part of 3-dimethylaminopropionamide and 1.9 parts of water are introduced. The mass is intensively agitated for about 30 seconds whereupon it is poured into a wax-lined box. The prepolymer expands to fill this mold with an odorless resilient foam which is subsequently cured at 100% relative humidity at room temperature for 5 days. The foam is finally dried at 90° C. for 1 hour. Its properties then are as follows:

TABLE I.—PROPERTY OF FOAM MADE FROM PREPOLYMER (A) USING CATALYSIS BY 3-DIMETHYLAMINOPROPIONAMIDE CATALYST

| | |
|---|---|
| Density (lb./cu. ft.) | 5.3 |
| Odor | None |
| Tensile strength (lb./sq. in.) | 40 |
| Yerzley resilience (percent) | 66 |
| (70° C. compression set (percent)) | 28 |

When Prepolymer (A) is treated with a comparable concentration of N-methyl morpholine catalyst, the foaming occurs after only half the delay time. The product has an objectionable odor.

EXAMPLE 2.—USE OF 3-DIETHYLAMINOPROPIONAMIDE CATALYST

*A. Foaming of Prepolymer (B)*

0.5 part of polydimethylsiloxane (50 centistoke grade) is stirred with 100 parts of Prepolymer (B) for 1 minute. Then 1.5 parts of 3-diethylaminopropionamide and 1.9 parts of water are introduced. The mass is vigorously agitated for about 30 seconds and the resulting mixture is poured into a paraffin-lined mold which it expands to fill in about 8 minutes. The odorless resilient foam obtained is stripped from the mold and cured at room temperature and 100% relative humidity for 5 days. It is finally dried for 1 hour at 90° C. The properties of this cured foam are given below in Table II.

When Prepolymer (B) is treated with trimethylamine instead of the amide catalyst, the resilient foam obtained has an objectionable strong odor.

TABLE II.—PROPERTIES OF FOAM MADE FROM PREPOLYMER (B) USING CATALYSIS BY 3-DIETHYLAMINOPROPIONAMIDE

| | |
|---|---|
| Oder | None |
| Density (lb./cu. ft.) | 2.8 |
| (25° C.) compression deflection (lb./sq. in.): | |
| To 20% | 0.59 |
| To 50% | 1.28 |
| (70° C.) compression set (percent) | 26 |

B. *Foaming of a Hydroxyl-Terminated Polyester and Toluene Diisocyanate*

(1) 1.0 part of a blend of polyalcohol carboxylic acid esters and sulfonated oils (commercially available as "Emcol" H77 from the Emulsol Corp.) is vigorously mixed with 70 parts of a hydroxyl-terminated polyester having a molecular weight of about 3000, said polyester being made by reacting diethylene glycol, trimethylpropane and adipic acid (commercially available from the Rohm and Haas Company as "Paraplex" U-148). Then 30 parts of a toluene diisocyanate isomer mixture (80% 2,4-; 20% 2,6-), 1.0 part of 3-diethylaminopropionamide, and 2.4 parts of water are introduced. The mass is intensively stirred for about 15 seconds and poured into a wax-lined mold. The mass expands for about 4 minutes. The odorless foam obtained is cured in a dry atmosphere for 16 hours at 90° C. to give the properties listed below in Table III.

(2) An experiment is carried out exactly as described above except that 1.0 part of N-methylmorpholine is employed in place of the 3-diethylaminopropionamide. The uncured foam has a strong odor. The properties of the cured foams obtained are given below in Table III.

TABLE III.—COMPARISON OF FOAMS MADE FROM A HYDROXYL-TERMINATED POLYESTER AND TOLUENE DIISOCYANATE USING CATALYSIS BY 3-DIETHYLAMINOPROPIONAMIDE AND N-METHYLMORPHOLINE

| Foam property | Catalyst present | |
|---|---|---|
| | (1%) N-methyl morpholine | (1%) 3-diethyl amino propionamide |
| Density (lb./cu. ft.) | 2.5 | 2.6 |
| (25° C.) compression deflection (lb./sq. in.) to— | | |
| 20% | 1.6 | 0.86 |
| 50% | 1.8 | 1.31 |
| (70° C.) compression set (lb./sq. in.) | 8 | 18 |

C. *Foaming of a Hydroxyl-Terminated Polyester and Toluene Diisocyanate*

80 parts of a hydroxyl-terminated polyester having a molecular weight of about 3000, said polyester being made by reacting diethylene glycol, trimethylpropane and adipic acid (commercially available from the Rohm and Haas Co. as "Paraplex" U-148), 13 parts of tri-(2-chloroethyl)phosphate, 1 part of ethylene oxide modified bis(4-hydroxyphenyl)methane (commercially available from the Shell Chemical Co. as "Epon" Resin 828), and 0.5 part of polyoxyethylene-modified polypropyleneether glycol (commercially available from Wyandotte Chemical Co. as "Pluronic" L-64) are vigorously agitated together for 1 minute. Then 31 parts of a toluene diisocyanate isomer mixture (80% 2,4-, 20% 2,6-) is introduced and stirred into the mass for 1 minute. A solution of 0.75 part 3-diethylaminopropionamide in 2.4 parts of water is added and the mass is intensively agitated for 15 seconds. The mixture obtained is poured into a wax-lined mold which it subsequently fills by expansion. The odorless resilient foam obtained is cured for 1 hour at 120° C. to obtain the properties given below in Table IV.

TABLE IV.—PROPERTIES OF A POLYESTER POLYURETHANE RESILIENT FOAM PREPARED USING 3-DIETHYLAMINOPROPIONAMIDE CATALYSIS

| | |
|---|---|
| Density (lbs./cu. ft.) | 3.9 |
| Tensile strength (lb./sq. in.) | 19.5 |
| Extension at break (percent) | 209 |
| Compression deflection (lb./sq. in.): | |
| To 20 percent | 0.66 |
| To 50 percent | 1.00 |
| (70° C.) compression set (percent) | 14.8 |
| Yerzley resilience (percent) | 42 |

The effect of accelerated aging on the characteristics of this foam are shown in Table V. The experiment is carried out by subjecting the foam to dry heat at 121° C. for intervals up to 14 days in length. The rest of the foam is aged at 90° C. for 1–14 days at 100% relative humidity.

TABLE V.—HEAT AGING CHARACTERISTICS OF A POLYESTER POLYURETHANE RESILIENT FOAM PREPARED USING 3-DIETHYLAMINOPROPIONAMIDE CATALYSIS

| Property | Aging—121° C. dry heat | | | |
|---|---|---|---|---|
| | 3 days | 5 days | 7 days | 14 days |
| Compression deflection (p.s.i.): | | | | |
| 25% (original) | 0.58 | 0.58 | 0.62 | 0.67 |
| 25% (aged) | | 0.97 | 1.04 | 1.09 |
| 50% (original) | | 0.89 | 0.89 | 0.98 |
| 50% (aged) | | 1.49 | 1.48 | 1.57 |
| (70° C.) Compression set (percent): | | | | |
| Original | 14.8 | 14.8 | 14.8 | 14.8 |
| Aged | 16.4 | 14.8 | 15.3 | 16.2 |

| Property | Aging—90° C. 100% relative humidity | | | | |
|---|---|---|---|---|---|
| | 1 day | 3 days | 5 days | 7 days | 14 days |
| Compression deflection (lbs. sq. in.): | | | | | |
| 25% (original) | 0.70 | 0.63 | 0.58 | 0.60 | 0.63 |
| 25% (aged) | 0.75 | 0.73 | 0.64 | 0.54 | 0.32 |
| 50% (original) | 1.00 | 0.90 | 0.83 | 0.85 | 0.91 |
| 50% (aged) | 1.10 | 1.03 | 0.93 | 0.81 | 0.49 |
| (70° C.) Compression set (percent): | | | | | |
| Original | 14.8 | 14.8 | 14.8 | 14.8 | 14.8 |
| Aged | 13.2 | 14.8 | 21.9 | 29.2 | 62.8 |

These results compare favorably with those obtained when a volatile catalyst is used which may be removed prior to the curing operation.

D. *Foaming of Prepolymer (C)*

100 parts of Prepolymer (C) is vigorously mixed with 0.5 part polydimethylsiloxane (50 centistoke grade) and 10 parts of didecyl phthalate for 1 minute. Then 2.0 parts of water and 1.0 part of 3-diethylaminopropionamide are introduced and the mass is stirred intensively for about 30 seconds. The resulting mixture is poured into a wax-lined carton. Expansion of the foaming mass is complete in about 7.5 minutes and the product becomes tack-free in about an hour. The odorless resilient foam obtained is removed from the mold and cured in a dry atmosphere at 121° C. for 3 hours to obtain the properties given below in Table VI.

TABLE VI.—PROPERTIES OF FOAM PREPARED FROM PREPOLYMER (C) USING 3-DIETHYLAMINOPROPIONAMIDE CATALYST

| | |
|---|---|
| Odor | None |
| Density (lb./cu. ft.) | 3.7 |
| (25° C.) compression deflection: | |
| To 25% (lb./sq. in.) | 0.93 |
| To 50% (lb./sq. in.) | 1.52 |
| (70° C.) compression set (percent) | 16 |

EXAMPLE 3.—USE OF 3-DI-n-PROPLYAMINOPROPIONAMIDE CATALYST

*Foaming of Prepolymer (C)*

0.5 part of polydimethylsiloxane is added to 100 parts of Prepolymer (C) and the mass is agitated vigorously for 1 minute. Then 1.0 part of 3-di-n-propylaminopropionamide and 2.0 parts of water are introduced. The reactants are stirred intensively for about 30 seconds and subsequently poured into a wax-lined mold where the mixture expands for about 8 minutes. The odorless resilient foam obtained is cured by exposure to a 50% relative humidity atmosphere at 90° C. for 3 hours followed by 1 hour at 90° C. in a dry oven. Table VII below gives the properties of the foam.

EXAMPLE 4.—USE OF 3-DI-n-BUTYLAMINOPROPIONAMIDE CATALYST

*Foaming of Prepolymer (C)*

Prepolymer (C) is foamed and cured exactly as described above in Example 3 except that 1.0 part of 3-di-n-butylamino propionamide is used in place of the 3-di-n-propylaminopropionamide. The properties of the cured resilient foam obtained are given below in Table VII.

TABLE VII.—PROPERTIES OF FOAMS MADE FROM PREPOLYMER (C) USING CATALYSIS BY 3-DIETHYLAMINOPROPIONAMIDE ANALOGUES

| Foam property | (1%) 3-di-n-propyl-aminopro-pionamide | Catalysis by (1%) 3-di-n-butyl-aminopro-pionamide |
|---|---|---|
| Odor | None | None |
| Density (lb./cu. ft.) | 3.6 | 4.2 |
| (25° C.) Compression deflection (lb./sq. in.) to— | | |
| 25% | 0.56 | 0.63 |
| 50% | 0.97 | 1.25 |
| (70° C.) Compression set (percent) | 11 | 23 |

EXAMPLE 5.—USE OF 3-MORPHOLINOPROPIONAMIDE CATALYST

*A. Foaming of Prepolymer (A) at Room Temperature*

(1) 1.0 part of polydimethyl siloxane (50 centistoke grade) is mixed with 100 parts of Prepolymer (A) at room temperature for 1 minute. Then 2.45 parts of an aqueous 62% (by weight) solution of 3-morpholinopropionamide (1.5 parts of active agent) and 0.95 part water are introduced. The mass is intensively agitated for 30 seconds and poured into a wax-lined mold. The odorless resilient foam obtained is cured at room temperature for 5 days at 100% relative humidity. The foam is then dried for 1 hour at 90° C. The properties of the cured foam are given below in Table VIII.

(2) When a control experiment is carried out using 1.5 parts of N-methyl morpholine in place of the 3-morpholino-propionamide, the foam time to reach a comparable height is reduced almost ten-fold. The resilient foam obtained has an objectionable strong odor.

TABLE VIII.—PROPERTIES OF A RESILIENT FOAM MADE FROM PREPOLYMER (A) USING CATALYSIS BY 3-MORPHOLINOPROPIONAMIDE AT ROOM TEMPERATURE

| | |
|---|---|
| Odor | None |
| Density (lb./cu. ft.) | 5.2 |
| Tensile strength (lb./sq. in.) | 37 |
| Extension at break (percent) | 165 |
| (70° C.) compression set (percent) | 17 |
| Yerzley resilience | 64 |

*B. Foaming of Prepolymer (C) at 70° C.*

(1) 100 parts of Prepolymer (C) (containing 9.5% free NCO), 0.25 part of polydimethylsiloxane (50 centistoke grade), 1.0 part of polyoxyethylene modified polypropyleneether glycol (commercially available from Wyandotte Chemical Co. as "Pluronic" L-81) and 5.0 parts of didecyl phthalate are intensively agitated at room temperature for 2 minutes. 3.0 parts of a 50% (by weight) aqueous solution of 3-morpholinopropionamide is treated with 0.1 part of a polyoxyethylated fatty alcohol. The resulting catalyst solution is slowly added with agitation to 2.0 parts of a cationic neoprene latex (commercially available from the Du Pont Company as T-950). This cationic neoprene latex type 950 has a 50% solids content, an initial pH of 9.3 and an average particle size of 0.1 micron, and, contains a quaternary ammonium salt as emulsifying agent.[1] The dispersion obtained is introduced into the prepolymer mixture and stirred for about 45 seconds. The resulting mass is poured into a wax-lined mold which is subsequently placed in a 70° C. oven for 15 minutes. The odorless foam is cured at 90° C. for 3 hours at 50% relative humidity. The properties of the foam are given in Table IX.

(2) Heat aging of the foam: The foams prepared above are heat-aged for 1–28 days by two methods: (1) Dry heat at 121° C.; (2) 100% relative humidity at 90° C. The results are assembled in Table IX. The heat aging behavior shown here is comparable to that observed when the polytetramethyleneether polyurethane foam tested has been prepared with a conventional volatile amine catalyst such as N-methyl morpholine.

TABLE IX.—EFFECT OF HEAT AGING ON THE 70° C. COMPRESSION SET OF A RESILIENT FOAM MADE FROM AN ISOCYANATE TERMINATED POLYTETRAMETHYLENEETHER POLYURETHANE WITH FOAMING CATALYSIS BY 3-MORPHOLINOPROPIONAMIDE

| | Foam cured 1 hr. at 120° C. | | Foam cured 3 hrs. at 90° C. and 50% R.H. | |
|---|---|---|---|---|
| Days | Aging at 121° C. | Aging at 90° C./100% R.H. | Aging at 121° C. | Aging at 90° C./100% R.H. |
| 0 | 13.3 | 13.3 | 10.9 | 10.9 |
| 1 | 16.1 | | 23.3 | |
| 3 | 20.6 | 15.7 | 28.5 | 23.1 |
| 5 | | 13.0 | | 26.8 |
| 7 | 13.4 | 35.8 | 13.7 | 50.6 |
| 14 | 15.0 | 53.4 | 14.7 | 46.1 |
| 28 | | | | |

EXAMPLE 6.—USE OF 3-DI-n-HEXYLAMINOPROPIONAMIDE CATALYST 2.5 parts of 3-di-n-hexylaminopropionamide and 0.25 part of polydimethyl siloxane (50 centistoke grade) are stirred intensively for 1 minute with 100 parts of Prepolymer (A) at room temperature. Then 2.7 parts of water is added. The mass is vigorously agitated and the resulting mixture poured into a wax-lined mold where it expands to give an odorless resilient foam.

EXAMPLE 7.—USE OF 2-DIETHYLAMINOACETAMIDE CATALYST 1.0 part of 2-diethylaminoacetamide and 0.25 part of polydimethylsiloxane (50 centistoke grade) are stirred for 1 minute with 100 parts of Prepolymer (A) at room temperature. The mixture obtained is treated with 2.7 parts of water. The mass is vigorously agitated and poured into a wax-lined mold. It slowly rises to give an odorless resilient foam.

EXAMPLE 8.—USE OF 3,3'-(ETHYLIMINO)DIPROPIONAMIDE CATALYST (A) 2 parts of 3,3'-(ethylimino)dipropionamide and 0.25 part of polydimethylsiloxane (50 centistoke grade) are stirred for 1 minute with 100 parts of Prepolymer (A) at room temperature. The mixture obtained is treated with 2.7 parts of water, vigorously agitated, and poured into a wax-lined mold where it rises slowly to give an odorless resilient foam.

(B) The experiment is carried out as described above except that the mold is transferred to a 70° C. oven as soon as the prepolymer has been poured. The mass rises quickly to fill the mold with an odorless resilient foam.

---

[1] Additional technical data in regard to this neoprene latex type 950 is disclosed in a booklet published by the Du Pont Company, dated October 1954 and entitled Neoprene Latex Type 950.

EXAMPLE 9.—USE OF 3,3'-(n-HEXYLAMINO)DIPROPIONAMIDE CATALYST 0.25 part of polydimethylsiloxane (50 centistoke grade) is stirred for 1 minute with 100 parts of Prepolymer (A) at room temperature. 2.86 parts of 3,3'-(n-hexylimino) dipropionamide is dissolved in 2.7 parts of water with agitation at 50° C. and the solution obtained is allowed to cool to about 40° C. The aqueous catalyst solution is then introduced into the prepolymer mixture with vigorous agitation. The mass is subsequently poured into a wax-lined form in which it expands to give an odorless resilient foam.

EXAMPLE 10.—USE OF 2-METHYL-3-DIETHYLAMINOPROPIONAMIDE CATALYST 2-methyl-3-diethylaminopropionamide is prepared by a procedure similar to that described for making 3-di-n-propylaminopropionamide. Diethylamine is added to 2-methacrylamide to yield the catalyst which is a water-soluble solid.

2.5 parts of 2-methyl-3-diethylaminopropionamide is stirred with 2.7 parts of water. The mixture obtained is added with agitation to 100 parts of Prepolymer (A) at room temperature containing 0.25 part of polydimethylsiloxane (50 centistoke grade). The catalyst exhibits delayed-action characteristics which are much better than N-ethyl morpholine at a comparable concentration. It is nearly as effective as 3-morpholinopropionamide. The prepolymer rises slowly to give an odorless resilient foam.

EXAMPLE 11.—USE OF 3-MORPHOLINOPROPIONAMIDE CATALYST

Prepolymer (D) is prepared in a dry reaction vessel protected from atmospheric moisture. A mixture of 7.2 parts (0.04 mole) of a toluenediisocyanate isomer mixture (80% 2,4- and 20% 2,6-) and 31.8 parts (0.03 mole) of polypropyleneether glycol with a number-average molecular weight of about 1025 is agitated at 90° C. for 8 hours. The prepolymer obtained is cooled to about 40° C., 7.5 parts (0.0416 mole) of the toluene-diisocyanate isomer mixture is added, and the mass is subsequently agitated for about a half hour. Prepolymer (D) thus obtained has a free NCO content of about 9.6% and a Brookfield viscosity at 30° C. of about 11,000 centipoises.

100 parts of Prepolymer (D) is mixed at room temperature with 0.8 part of polydimethylsiloxane (50 centistokes grade) for about 1 minute. Then 1.5 part of 3-morpholinopropionamide and 1.9 parts of water are introduced. The mass is vigorously agitated for about 30 seconds and the resulting mixture is poured into a paraffin-lined mold. This form is transferred to a 70° C. oven and kept there for 15 minutes. The prepolymer mass rapidly expands during this interval to fill the mold with a soft elastic foam which has no odor.

EXAMPLE 12.—USE OF 3-DIETHYLAMINOPROPIONAMIDE CATALYST

Prepolymer (E) is prepared by adding 47 parts (0.256 mole) of a toluenediisocyanate isomer mixture (80% 2,4-, 20% 2,6-) to a well-agitated mixture of 100 parts (0.0512 mole) of ethylene oxide-modified polypropyleneether glycol (commercially available from Wyandotte Chemicals Corporation as "Pluronic" L-61) and 3 parts (0.022 mole) of trimethylolpropane at 60° C. under anhydrous conditions. The reactants are subsequently stirred at 70° C. for 6 hours.

100 parts of Prepolymer (E) is mixed at room temperature with 0.8 part of polydimethylsiloxane (50 centistokes grade) for about 1 minute, in accordance with the same procedure of Example 11, 3-diethylaminopropionamide being utilized as the catalyst. The resulting mixture is poured into a wax-lined mold which it expands to fill in about 8 minutes. The soft resilient foam obtained is completely odorless.

EXAMPLE 13.—USE OF 3-DIETHYLAMINOPROPIONAMIDE CATALYST

Prepolymer (F) is prepared by agitating under anhydrous conditions 100 parts of a propylene oxide-ethylene oxide-modified ethylene diamine (commerically available from Wyandotte Chemicals Corporation as "Tetronic" 701) and 34.8 parts of a toluene-diisocyanate isomer mixture (80% 2,4- and 20% 2,6-) at 70° C. for 1 hour.

100 parts of Prepolymer (F) is treated by the same procedure used in Example 12. The product obtained is a soft completely odorless resilient foam.

What is claimed is:

1. In the process of preparing a cellular isocyanate product by mixing a polyalkyleneether glycol of a molecular weight below about 10,000 with an arylene polyisocyanate and water, the improvement which comprises incorporating therein, prior to the formation of a cellular product 0.25-3.0% by weight of the total composition of a catalyst taken from the group consisting of 3-morpholinopropionamide and a catalyst having the structure

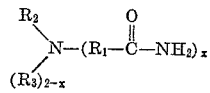

wherein $R_1$ is taken from the group consisting of methylene, ethylene, methyl-substituted methylene and methyl-substituted ethylene; $R_2$ is an alkyl radical of from 1 to 6 carbon atoms; $R_3$ is an alkyl radical of from 1 to 6 carbon atoms, and, $x$ is an integer from 1 to 2.

2. The process of claim 1 wherein the catalyst incorporated into the mixture is 3-morpholinopropionamide.

3. The process of claim 1 wherein the catalyst incorporated into the mixture is 3-diethylaminopropionamide.

4. The process of claim 1 wherein the arylene polyisocyanate is a 2,4-toluene diisocyanate and 2,6-toluene diisocyanate isomer mixture.

5. The process of claim 1 wherein an isocyanate terminated polyalkyleneether polyurethane is mixed with water.

References Cited in the file of this patent

UNITED STATES PATENTS

| 2,764,565 | Hoppe et al. | Sept. 25, 1956 |
| 2,911,379 | Parker et al. | Nov. 3, 1959 |

FOREIGN PATENTS

| 754,502 | Great Britain | Aug. 8, 1956 |

UNITED STATES PATENT OFFICE

CERTIFICATE OF CORRECTION

Patent No. 3,073,787                            January 15, 1963

Stanley Earl Krahler

It is hereby certified that error appears in the above numbered patent requiring correction and that the said Letters Patent should read as corrected below.

In the grant, line 1, and in the heading to the printed specification, line 4, for "Stanley Earl Krakler" read -- Stanley Earl Krahler --; column 2, line 52, for "procursor" read -- precursor --; column 6, line 74, for "3-dimethylaminopropionamide" read -- 3-diethylaminopropionamide --; column 8, line 14, for "as" read -- a --.

Signed and sealed this 27th day of August 1963.

(SEAL)
Attest:

ERNEST W. SWIDER
Attesting Officer

DAVID L. LADD
Commissioner of Patents